United States Patent [19]

Kelly, Sr.

[11] Patent Number: 4,824,049
[45] Date of Patent: Apr. 25, 1989

[54] MECHANICAL COUPLING FOR TAPE

[75] Inventor: Terence C. Kelly, Sr., Swarthmore, Pa.

[73] Assignee: Wickes Manufacturing Company, Southfield, Mich.

[21] Appl. No.: 124,721

[22] Filed: Nov. 24, 1987

[51] Int. Cl.$^4$ .............................................. B64F 1/02
[52] U.S. Cl. ........................... 244/110 C; 24/68 CD; 24/71.2; 403/209; 410/101; 242/74
[58] Field of Search ...................... 244/110 R, 110 C; 24/302, 114.5, 572, 700, 701, 702, 265 CD, 265 R, 68 RT, 68 CD, 71.2; 410/101, 103; 403/407.1, 179, 209, 210, 215; 242/74

[56] References Cited

U.S. PATENT DOCUMENTS

| | | | |
|---|---|---|---|
| 1,599,769 | 9/1926 | Jaynes | 242/74 |
| 3,428,275 | 2/1969 | Candodina et al. | 244/110 C |
| 3,802,641 | 4/1974 | Saito | 242/74 |
| 4,385,736 | 5/1983 | Yamamoto | 242/74 |
| 4,458,388 | 7/1984 | Fargo et al. | 24/302 |

FOREIGN PATENT DOCUMENTS 489709  2/1976  U.S.S.R. ........................... 24/265 R

*Primary Examiner*—Galen Barefoot
*Attorney, Agent, or Firm*—William J. Spatz; David A. Greenlee

[57] ABSTRACT

An improved coupling for connecting an arresting pendant and the woven tape utilized in an aircraft arresting system is provided. The coupling consists of an elongated hollow body having at least one open end and a longitudinal slot which extends into its hollow interior. A mounting bracket for connection of the coupling to the arresting system pendant is attached to the side of the coupling body which is opposite from the slot. The tape from the arresting system is wrapped between and around a plurality of clamping bars and is then inserted through an open end of the coupling body with the connected end of the tape extending through the longitudinal slot. The clamping bars are sized and shaped to substantially fill the interior of the coupling body and to grip to the tape which is wrapped then around. The invention can also be utilized in conjunction with an arresting tape having a closed loop at its bitter end by placing a restraining bar into the loop at the end of the tape and inserting the tape and bar combination into an open end of the tape coupling with the connected end of the tape extending through the longitudinal slot. The tape coupling of the invention can be strengthen by mounting reinforcing collars on the open ends of the coupling body.

8 Claims, 3 Drawing Sheets

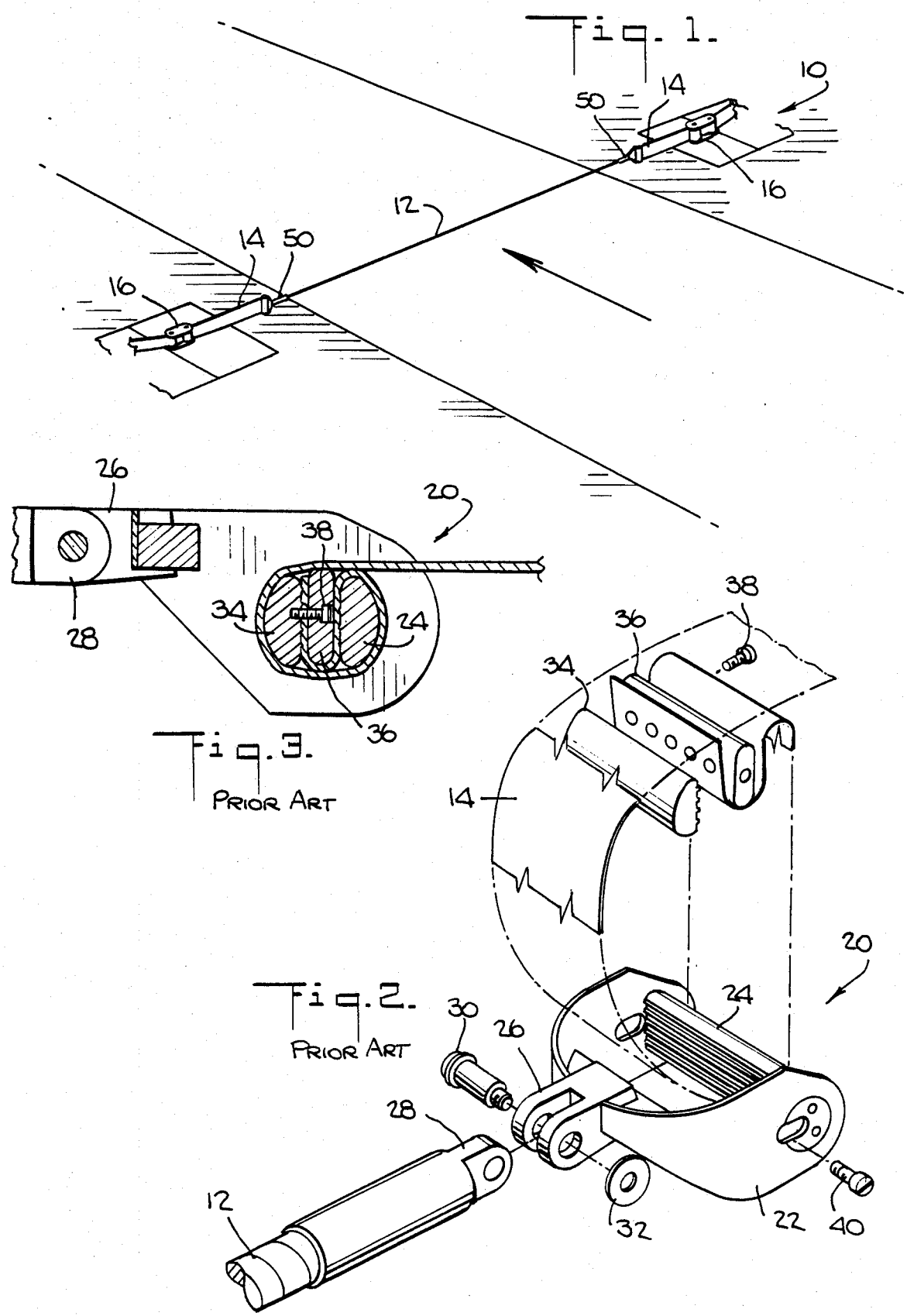

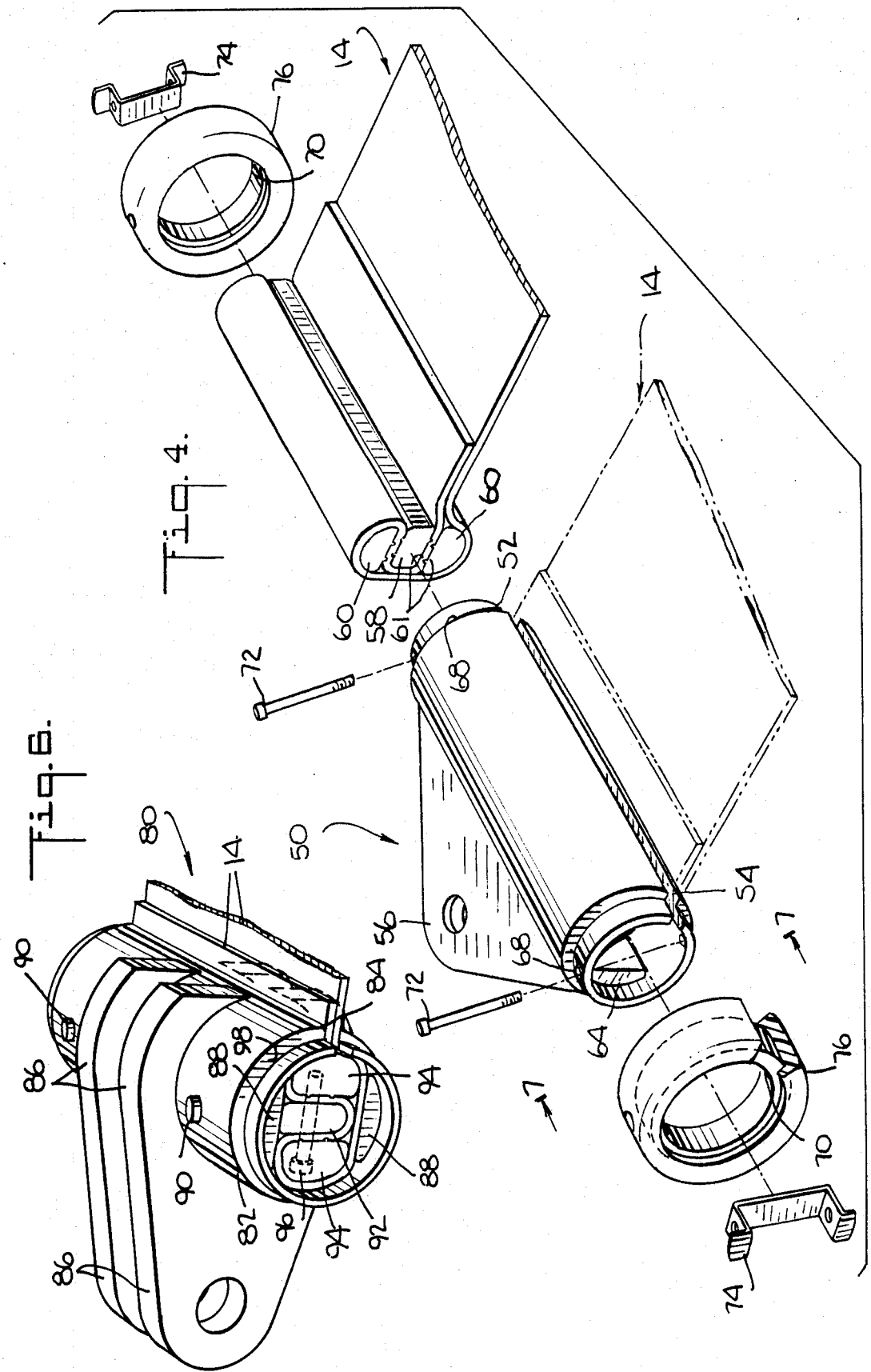

MECHANICAL COUPLING FOR TAPE

BACKGROUND OF THE INVENTION

The present invention pertains to the art of couplings. The invention finds particular application in couplings used in aircraft arresting systems.

It has become common practice in aircraft arresting systems to provide a cable or pendant stretched across a runway for engagement by a landing aircraft, an energy absorber adjacent to the runway, and a flat woven band or tape which connects the cable or pendant to the energy absorber. Mechanical couplings are used between the woven tape and the cable or pendant and between the tape and energy absorber. The present invention is directed primarily to a coupling for use between the pendant and the woven tape; however, the invention has broader applications.

When an aircraft engages a pendant, a tremendous force is exerted by the pendant onto the tape. This force must be transmitted through the mechanical coupling. Consequentially, the coupling between the tape and the pendant must be sufficiently strong to endure high forces without failure. Additionally, the portion of the tape which connects to the pendant is normally exposed to the environment which deteriorates it, so a superior mechanical coupling will enable users to conveniently make a new connection, if it becomes necessary to crop the deteriorated portion of the tape. Preferred mechanical couplings will also have relatively low weight and will be designed so that they can be pulled down the runway without being subject to damage.

Various couplings have been designed for attaching tape to an aircraft engaging pendant. For example, the tape has been clamped between two bars, looped around an anvil which is mounted between the sides of a U-shaped coupling and then locked into position with bolts. While this type of coupling has heretofore provided satisfactory holding power, it has suffered the disadvantage of having its tape connection fully enclosed by the coupling and thus not subject to inspection without disassembly of the coupling.

SUMMARY OF THE INVENTION

Recently, a completely new concept has been developed to couple a tape to a pendant. It utilizes a conduit with a longitudinal slot as a coupling member. To engage the coupling, the bitter end of the tape is wrapped around one or more clamping bars which are sized and shaped to, collectively, substantially fill the conduit and the combination is then slid through an open end of the conduit with the free end of the tape extending through the conduit slot. The clamping bars firmly grip the tape and the friction forces imparted on the tape by the clamping bars and the conduit hold the tape in place against the forces imposed by the pendant. In a second embodiment of the invention, the bitter end of the tape is looped by sewing or otherwise affixing the bitter end of the tape to an adjacent tape section, a restraining bar is inserted into the tape loop and then the combination is inserted through an open end of the conduit with the free tape extending through the conduit's slot. Since the restraining bar is sized to substantially fill the hollow interior of the conduit, and can not pass through the conduit slot, the tape is held in the coupling against forces imposed by the pendant. In either embodiment of the invention, a superior coupling is provided between the pendant and the tape. Further, since the conduit must have at least one open end, the wrap of the tape around the clamping bars or restraining bar can be seen and without detaching the tape from the coupling. Because of the simplicity of the coupling structure, it can be easily assembled without significant risk of error.

In the frictional clamping embodiment of the invention, the tape is best wrapped around a plurality of clamping bars whereby it can be made to take a tortuous path maximizing the length of the tape exposed to frictional forces. Further, in a preferred embodiment of the invention, the clamping bars are applied to the tape at a point slightly removed from its bitter end, and the bitter end of the tape is wrapped so that it extends through the conduit slot and overlaps a portion of the tape entering the pendant. This provides an extremely convenient check point for tape slippage. The clamping bars can also be provided with surface enhancements to increase their frictional grip on the tape.

The primary object of the present invention is to provide a tape coupling which can hold a tape against severe tensional forces.

Another object of the present invention is to provide a tape coupling which can be used with a tape having its bitter end free and also with a tape having a looped end.

Another object of the present invention is the provision of a tape coupling which permits the inspection of the coupled portion of the tape, whereby it is possible to verify that the tape has not moved or slipped under load, without disassemblying the coupling.

Still another object of the present invention is the provision of a coupling which can be readily protected from damage which might otherwise result from being pulled down the runway.

BRIEF DESCRIPTION OF THE DRAWINGS

The invention, as well as its objects and features, will be better understood by reference to the following detailed description of the preferred embodiments of this invention in conjunction with the accompanying drawings in which:

FIG. 1 is a perspective view showing an arresting system equipped with a tape coupling according to the present invention;

FIG. 2 is exploded perspective view of a prior art tape coupling;

FIG. 3 is a cross-sectional side view of the prior art tape coupling of FIG. 2;

FIG. 4 is an exploded perspective view of a preferred embodiment of the present invention;

FIG. 5 is a partial cross-sectional end view of the tape coupling of FIG. 4;

DETAILED DESCRIPTION OF THE INVENTION

Figure 6:
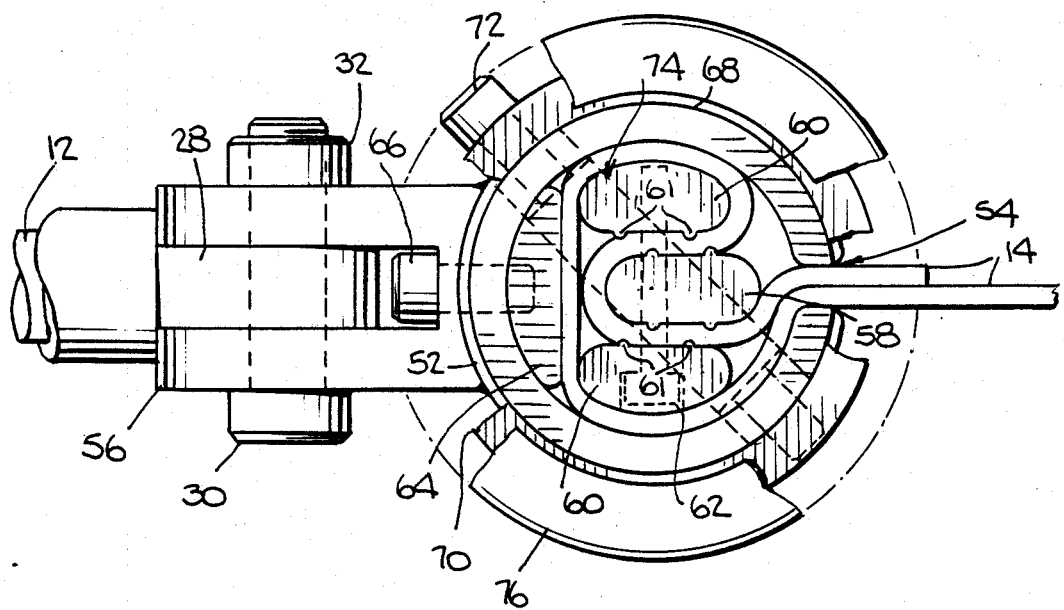
FIG. 6 is a perspective view of an alternate tape coupling according to the invention.

Referring to the drawings wherein like parts are designated by the same number in all the various figures, FIG. shows the general arrangement of an aircraft arresting system 10 utilizing tape couplings in accordance with the present invention.

The specific arrangement and construction of aircraft arresting system 10 is not important to the present invention, but it will generally comprise an aircraft engaging pendant 12 which extends traversely of the runway and is connected at its opposite ends to tapes 14. Tape couplings 50 connect pendant 12 and tapes 14. Tapes 14 extends through guide sheaves 16 to engage tape reels (not shown) which are mounted for rotation at the side of the runway. The tape reels are provided with heavy duty brakes which apply the necessary braking force to slow and stop an aircraft which has engaged pendant 12 and caused the unwinding of tapes 14 from the tape reels.

A prior art tape coupling 20 is illustrated in FIG. 2. It consists of a U-shaped frame 22 having anvil 24 extending between its sides. The base of the U-shaped coupling is provided with mounting bracket 26 which is adapted to receive pendant lug 28. Pin 30 and retainer 32 are used to removably connect pendant 12 to tape coupling 20. Prior to being mounted in tape coupling 20, the bitter end of tape 14 is clamped between tape clamps 34 and 36 which are held together by a plurality of screws 38. The clamp/tape assembly is then wrapped around anvil 24 and is bolted with bolts 40 into frame 22 adjacent to anvil 24. It will be readily appreciated that with the prior art design, it is not possible to determine whether tape 14 has been properly mounted within tape coupling 20, or whether forces imposed on tape 14 have caused slippage, without disassemblying coupling 20.

Tape coupling 50 according to the present invention is depicted in FIG. 4 in exploded spaced-apart array to make it evident how its elements are assembled. Coupling 50 includes an open ended coupling body 52 which has a longitudinal slot 54 which extends through body 52 to a hollow interior. On the exterior surface of body 52 which is opposite to slot 54 is mounting bracket 56. Bracket 56 is adapted to receive lug 28 on pendant 12. Tape 14 is wrapped around center clamp bar 58 and two end clamp bars 60 and, in the preferred embodiment of the invention, the three clamp bars are bolted together by a plurality of bolts 62 which extend through the clamp bars and the intervening sections of tape 14. Clamp bars 58 and 60 have surface enhancements 61 to improve their grip on tape 14. The number of clamping bars, surface enhancements and bolts used for a given application will depend on the magnitude of the anticipated arresting loads. The tape wrapped assembly of clamping bars 58 and 6 is sized and shaped to substantially fill the hollow interior of coupling body 52. To substantially fill the interior of a coupling body, the clamping bars and tape need only have a collective shape and size, relative to the cavity in the coupling body, which prevents them from rotating in the coupling body. While the depicted coupling body 52 is fabricated from a length of steel tubing and has a circular internal cross-section, this is not an essential element of the invention. Coupling body 52 may have the axial cross-section of any polygon or closed plane curve. However, where a coupling body with an interior void of generally circular cross-section is utilized, it has been found to be advantageous to equip body 52 with one or more anti-torque members, such as filler bar 64, to prevent clamping members 58 and 60 from rotating within body 52. Filler bar 64 is bolted into conduit body 52 with a plurality of mounting bolts 66. The number bolts 66 utilized for a given application will depend on the length of filler bar 64 and the strength of bolts 66.

It has been found that the tape couplings according to this embodiment of the invention will impose the highest gripping forces on tape 14 when the tape is wrapped around a plurality of clamping bars, such that it passes between at least two clamping bars and then has its brake connected end wrapped around the outside surface of the clamping bars before it exits the coupling slot. In this fashion, tensional forces on tape 14 are transmitted to the clamping bars and drive them to more tightly grip the intervening sections of tape 14, whereby the greater the tensional force imposed on tape 14, the stronger the frictional grip imposed by the clamping bars. In the embodiments of the invention depicted in FIGS. 4 and 6, the bitter end of tape 14 passes between the center clamping bar and each of the end clamping bars before its operative end is wrapped around the radially outside surfaces of the end clamping bars and exits the coupling slot.

Coupling 50 is loaded by sliding the tape wrapped assembly of clamping bars 58 and 60 through an open end of body 52 with the free end of tape 14 passing through slot 54. In the depicted preferred embodiment of the invention, clamping bars 58 and 60 are applied to a section of tape 14 which is removed from its bitter end, such that there is a free length of tape 14 extending from clamping bars 58 and 60 after they are loaded and wrapped. As aforedescribed, this length of tape at the bitter end of tape 14 is slid through slot 54 adjacent to the section of tape which extends to the tape reels. It provides a very convenient check point for tape slippage.

Slot 54 and mounting bracket 56 are aligned on opposite sides of coupling body 52 such that when tape 14 and pendant 12 are in tension, tape coupling 50 has thru-the-center loading. Coupling body 52 has shoulders 68 on each of its axial ends. Collars 70 fit tightly over the ends of conduit body 52 and abut shoulder 68. Collars 70 serve to strengthen coupling body 52 and to prevent it from being expanded at slot 54 by the forces imparted thereon by tape 14. It should be appreciated that collars 70 are not necessary when coupling body 52 has a heavy duty construction relative to the loads to be imposed. Generally, however, it is considered to be advantageous to make coupling body 52 of a light construction and to strengthen it with collars 70. While coupling body 52 is shown to be open at both of its ends, it is only necessary for one end of coupling body 52 to be open to receive tape 14 and its enwrapped clamping bars. Accordingly, coupling body 52 may be fabricated with one closed end. Collars 70 are attached to coupling body 52 with locking screws 72, which also serve to hold clamp bar retainers 74 in place. Alternatively, the ends of coupling body 52 and the interior of collars 70 can be provided with complimentary threads and collars 70 can be screwed onto coupling body 52. Collars 70 are provided with protective covers 76 which are made of a flexible resilient thermoplastic material, such as polypropylene. Protective covers 76 are molded onto collars 70, but they could be affixed thereto with adhesives or mechanical fasteners. Protective covers 76 have a radial projection which is greater than coupling body 52 or collars 70, so that they are prevented from contacting the runway, when coupling 50 is dragged during an aircraft arrestment.

An alternate embodiment of the invention is depicted in FIG. 6. Tape coupling 80 includes a coupling body 82 which has a longitudinal slot 84 extending to its hollow interior. Tape coupling 80 is provided with a mounting bracket which consists of two extended C-shaped plates 86 which partially surround coupling body 82. C-shaped plates 86 are attached to coupling body 82 just far enough apart so lug 28 on pendant 12 can pass therebetween, thereby enabling pendant 12 to be connected thereto with pin 30 and retainer 32. The center line of the mounting bracket formed by plates 86 is aligned with slot 84, such that when tape 14 and pendant 12 are in tension, tape coupling 80 has through-the-center loading. C-shaped plates 86 serve to strengthen the connection between the mounting bracket and coupling body 82 and at the same time to strengthen coupling body 82 against forces which tend to expand its walls and enlarge slot 84. Tape coupling 80 is also fabricated from a length of steel pipe and thus has a hollow interior which is circular in cross-section. Coupling 80 has two anti-torque bars 88 bolted to its interior surface with a plurality of bolts 90. Anti-torque bars 88 prevent the rotation of center clamping bar 92 and end clamping bars 94 in coupling body 82. Clamping bars 92 and 94 are wrapped with tape 14 and connected through the intervening sections of tape 14 with bolts 96. Like tape coupling 50, coupling 80 has shoulders 98 on each of its axial ends. Where necessary to strengthen coupling 80, collars 70 can be mounted on the ends of coupling 80, abutting shoulders 98, and held in place with locking screw 72 or any other suitable mechanical fastener. Even if collars 70 are not used in a given application for the tape couplings of the invention, retainer 74 will generally be utilized to prevent tape 14 and its clamping bars from sliding out of an open end of the tape coupling.

Figure 7:
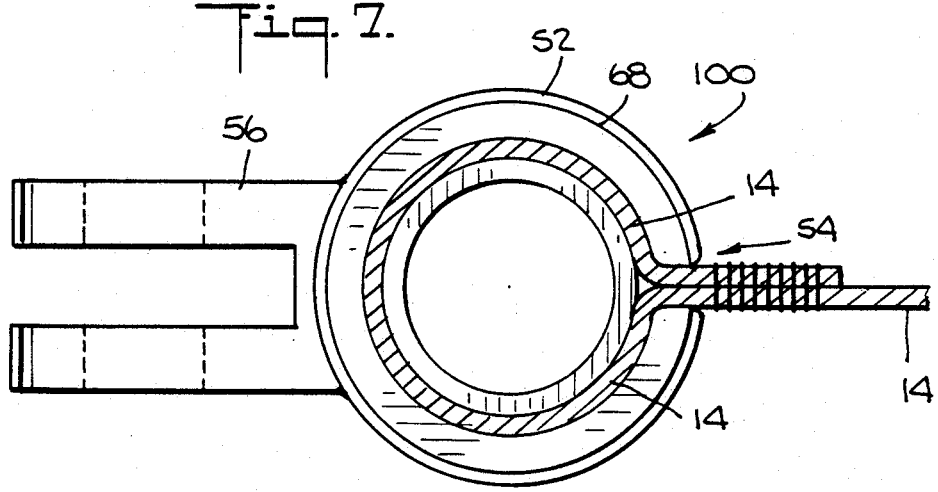
FIG. 7 is an end view of the tape coupling body of FIG. 4 taken along line 7—7, without collars, protective covers or retainers, and with internal modifications for use in conjunction with a tape having a closed loop at its bitter end.

Depicted in FIG. 7 is an embodiment of the invention which can be utilized when tape having a closed loop provided at its bitter end is in service. Tape coupling 100 includes the same open ended coupling body 52, longitudinal slot 54, and mounting bracket 56 found in tape coupling 50. However, its internal configuration deviates from coupling 50 by its use of restraining bar 102 to hold tape 14 in coupling 100. In this embodiment of the invention restraining bar 102 is inserted into the loop at the end of tape 14, and the combination of the tape and the restraining bar is then inserted into an open end of coupling body 52, with the sewn end of tape 14 passing through slot 54. As with the other embodiments of the invention, coupling 100 can also be fabricated with only one open end. In the preferred embodiment of the invention, for reasons of minimizing the weight of coupling 100, restraining bar 102 consists of a length of tube which is at least substantially as long as tape 14 is wide and which is sized to substantially fill the hollow interior of coupling body 52 in its radial dimension. Of course, if a coupling body with an internal cross-section which is other than circular is used, restraining bar 102 should have a shape which corresponds to the coupling body's internal cross-section. If necessary to strengthen coupling 100 against anticipated arresting loads, collars 70 are mounted ends of conduit body 52 in contact with shoulders 68. Collars 70 and restraining bar 102 are held in place with, respectively, locking screw 72 and retainer 74.

What is claimed is:

1. An aircraft arresting system coupling for connecting an aircraft engaging pendant and an energy absorber drive tape comprising:
    an elongated hollow coupling body which is at least as long as the tape is wide and which has at least one open end,
    a plurality of clamping bars having complementary tape gripping surfaces for frictionally restraining the tape from sliding therebetween,
    said clamping bars having a size and shape that when their complementary surfaces are applied to the opposite sides of the tape, the assembly of tape and clamping bars can pass through the open end of the coupling body into the hollow interior of the coupling body,
    said coupling body having an axial slot extending therethrough which starts at an open end of the coupling body and has a width and length which is at least equal to, respectively, the thickness and width of the tape, whereby a section of the tape which is connected to the arresting system can pass through the slot as the assembly of the clamping bars and the tape is inserted into the hollow interior of the coupling body through its open end, and
    a bracket means for connecting said coupling body to the aircraft engaging pendant, said bracket means being affixed to said coupling body opposite to said slot, whereby when the coupling is in operation and the pendant and tape are in tension, the coupling has through-the-center loading.

2. The coupling of claim 1 wherein the elongated coupling body is a length of tubing.

3. The coupling of claim 1 wherein an anti-torque member is affixed to the interior surface of the coupling body whereby the hollow interior of said coupling body is given a non-symmetrical cross section which inhibits the rotation therein of the clamping bars and tape.

4. The coupling of claim 1 wherein the plurality of clamping bars is comprised of first and second end clamping bars and a center clamping bar with the end clamping bars disposed on opposite sides of the center clamping bar and with the tape extending between the first end clamping bar and the center clamping bar and then between the opposite face of the center clamping bar and the second end clamping bar, and then around the radially outer surfaces of the clamping bars, and then extends through the tape slot to the arresting system, whereby when in operation tensional forces are imposed on the tape, they are transmitted to the clamping bars to drive them into tighter engagement with the intervening sections of the tape.

5. The coupling of claim 3 wherein the plurality of clamping bars is comprised of first and second end clamping bars and a center clamping bar with the end clamping bars disposed on opposite sides of the center clamping bar and with the tape extending between the first end clamping bar and the center clamping bar and then between the opposite face of the center clamping bar and the second end clamping bar, and then around the radially outer surfaces of the clamping bars, and then extends through the tape slot to the arresting system, whereby when in operation tensional forces are imposed on the tape, they are transmitted to the clamping bars to drive them into tighter engagement with the intervening sections of the tape.

6. The coupling of claim 1 wherein the plurality of clamping bars is applied to said tape at a position which is spaced from the bitter end of the tape whereby the bitter end of the tape extends from the assembly of clamping bars and the tape and passes through the axial slot in the coupling body adjacent to the section of the tape which is connected to the arresting system.

7. The coupling of claim 4 wherein the plurality of clamping bars is applied to said tape at a position which is spaced from the bitter end of the tape whereby the bitter end of the tape extends from the assembly of clamping bars and the tape and passes through the axial slot in the coupling body adjacent to the section of the tape which is connected to the arresting system.

8. An aircraft arresting system coupling for connecting an aircraft engaging pendant and an energy absorber drive tape which has a looped end comprising:

any elongated hollow coupling body which is at least as long as the tape is wide and which has at least one open end, a restraining bar slidably mounted in the looped end of the tape, said bar having a size and shape such that the assembly of the restraining bar and tape can pass through the open end of the coupling body into the hollow interior of the coupling body, said coupling body having an axial slot extending therethrough which starts at an open end of the coupling body and has a width and length which is at least equal to, respectively, the thickness and width of the tape, whereby a section of the tape which is connected to the arresting system can pass through the slot as the assembly of the restraining bar and the looped tape end is inserted into the hollow interior of the coupling body through its open end, and a bracket means for connecting said coupling body to the aircraft engaging pendant, said bracket means being affixed to said coupling body opposite to said slot, whereby when the coupling is in operation and the pendant and tape are in tension, the coupling has through-the-center loading.

* * * * *

UNITED STATES PATENT AND TRADEMARK OFFICE
CERTIFICATE OF CORRECTION

PATENT NO. : 4,824,049
DATED : April 25, 1989
INVENTOR(S) : Terence C. Kelly, Sr.

It is certified that error appears in the above-identified patent and that said Letters Patent is hereby corrected as shown below:

Col. 2, line 66, after "FIG." insert --1--

Col. 3, line 49, "6" should read --60--

Signed and Sealed this

Second Day of January, 1990

Attest:

JEFFREY M. SAMUELS

Attesting Officer     Acting Commissioner of Patents and Trademarks